United States Patent
Murdock-Armstrong

(10) Patent No.: US 6,314,288 B1
(45) Date of Patent: Nov. 6, 2001

(54) ERROR MANAGEMENT IN A MESSAGING/TELEPHONY LOCATION INTERWORKING SERVICE

(75) Inventor: Beverly Murdock-Armstrong, Ashburn, VA (US)

(73) Assignee: Iridium IP LLC, Washington, DC (US)

( * ) Notice: Subject to any disclaimer, the term of this patent is extended or adjusted under 35 U.S.C. 154(b) by 0 days.

(21) Appl. No.: 09/215,891

(22) Filed: Dec. 16, 1998

(51) Int. Cl.⁷ ....................................................... H04Q 7/20
(52) U.S. Cl. ........................ 455/426; 455/427; 455/430; 455/432; 455/433
(58) Field of Search .................................. 455/426–435, 455/405, 406, 408, 456, 459, 460, 461, 466, 9, 12.1, 13.1

(56) References Cited

U.S. PATENT DOCUMENTS

| | | | |
|---|---|---|---|
| 5,404,569 | * | 4/1995 | Schwendeman et al. ........... 455/13.4 |
| 5,797,097 | * | 8/1998 | Roach, Jr. et al. .................. 455/456 |
| 6,070,050 | * | 5/2000 | Penny, Jr. ............................ 455/12.1 |
| 6,073,012 | * | 6/2000 | Vanden Heuvel et al. ........... 455/427 |
| 6,128,487 | * | 10/2000 | Wiedeman ............................ 455/426 |

* cited by examiner

Primary Examiner—Daniel Hunter
Assistant Examiner—Meless Zewdu
(74) Attorney, Agent, or Firm—Pepper Hamilton, LLP

(57) ABSTRACT

The present invention provides a method for updating a location of a subscriber for paging in a global telecommunications network where the subscriber has both a wireless subscriber unit and a pager. The method includes obtaining a first current location for the wireless subscriber unit, attempting to update a second current location for the pager based upon the first current location; updating the second location based upon a default location if the attempt fails. In the preferred embodiment, the second current location is updated based upon the first current location if the attempt is successful. The method of the present invention bundles a subscriber's wireless subscriber unit number with his pager number and uses the wireless subscriber unit's current location to determine the first delivery area for a page. When an error occurs, the method uses a default delivery area and attempts delivery there. By managing errors in this manner, message delivery is more reliable. This method also saves the subscriber time which he would otherwise spend manually updating his position. It eliminates the problem where the subscriber misses pages when he forgets to update his location or enters the wrong location code. It has the added advantage of reducing the number of location delivery areas in the delivery list which results in more efficient use of network resources.

28 Claims, 16 Drawing Sheets

Note: Information in parentheses is the parameters contained within the message.
The MTC has the ability to map MDA, LAC, and MSCid to LDAs and associated SV beams.
The IIU can be either a VLR or HLR.

Homed on Iridium network and roaming on Iridium network

Homed on Iridium network and
Roaming on GSM protocol jurisdiction

Homed on Iridium network and
Roaming on IS-41 protocol jurisdiction

Homed on GSM protocol jurisdiction and Roaming on Iridium network

Homed on IS-41 protocol jurisdiction and Roaming on Iridium network

Homed on GSM protocol jurisdiction and
Roaming on IS-41 protocol jurisdiction

Homed on IS-41 protocol jurisdiction and Roaming on GSM protocol jurisdiction

ERROR MANAGEMENT IN A MESSAGING/ TELEPHONY LOCATION INTERWORKING SERVICE

FIELD OF THE INVENTION

The present invention relates to telecommunications networks, and in particular to the automatic location update for messaging in a global telecommunications network.

BACKGROUND OF THE INVENTION

With the development of a global economy, business persons who regularly travel to other countries are a fast growing breed. To meet their needs, satellite-based global telecommunications networks are being developed. The first such network was commercially activated by Iridium LLC on Nov. 1, 1998. These networks provide international wireless phone, paging, fax, and data services. Often a subscriber will have both a network wireless subscriber unit, such as a wireless phone, and a network pager. Whenever a network subscriber roams outside of his local delivery area with his pager, the subscriber must manually update his location, typically by calling in and giving his current location. The location is conventionally a code which represents a particular geographic area in which the subscriber plans to roam. When a page is to be sent to a subscriber, the signal is sent to this entire geographic area. This manual updating is time consuming for the subscriber. If the subscriber forgets to update his location or enters the wrong location code, then he will miss pages. Also, to achieve a high probability of reaching the subscriber's pager, the pager signal is sent to the entire geographic area since the subscriber could be anywhere within that area. This means that the area paged is often larger than is necessary to reach the pager, resulting in inefficient use of network resources.

Accordingly, there exists a need for a method for an automatic location update for network paging. The method should include error management to improve reliability. It should also save subscribers time, reduce the number of missed pages, and result in a more efficient use of network resources. The present invention addresses such a need.

SUMMARY OF THE INVENTION

The present invention provides a method for updating a location of a subscriber for paging in a global telecommunications network where the subscriber has both a wireless subscriber unit and a pager. The method includes obtaining a first current location for the wireless subscriber unit, attempting to update a second current location for the pager based upon the first current location; updating the second location based upon a default location if the attempt fails. In the preferred embodiment, the second current location is updated based upon the first current location if the attempt is successful. The method of the present invention bundles a subscriber's wireless subscriber unit number with his pager number and uses the wireless subscriber unit's current location to determine the first delivery area for a page. When an error occurs, the method uses a default delivery area and attempts delivery there. By managing errors in this manner, message delivery is more reliable. This method also saves the subscriber time which he would otherwise spend manually updating his position. It eliminates the problem where the subscriber misses pages when he forgets to update his location or enters the wrong location code. It has the added advantage of reducing the number of location delivery areas in the delivery list which results in more efficient use of network resources.

DETAILED DESCRIPTION

The present invention provides a method for an automatic location update for network paging with error management. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method of the present invention bundles a subscriber's wireless subscriber unit number with his pager number and uses the wireless subscriber unit's current location to determine the delivery area for a page.

For ease of reference, Table 1 is a list of acronyms used in this specification:

TABLE 1

ACRONYMS

| | |
|---|---|
| EIR | Equipment Identification Register |
| BSS | Business Support System |
| GBS | Gateway Business System |
| GMS | Gateway Management System |
| GSM | Global System for Mobile Communications |
| HGW | Home Gateway |
| HLR | Home Location Register |
| ICRS | Iridium Cellular Roaming Service |
| IIU | Iridium Interworking Unit |
| IMSI | International Mobile Subscriber Identity |
| ISC | International Switching Center |
| ISDN-A | Individual Subscriber Directory Number-A |
| LAC | Location Area Code |
| LAI | Location Area Identity |
| LDA | Logical Delivery Area |
| MDA | Message Delivery Area |
| MDR | Message Delivery Request |
| MIN | Mobile Identification Number |
| MOC | Message Origination Controller |
| MSC | Mobile Switching Center |
| MSCid | Mobile Switching Center Identity |
| MSISDN Number | Mobile Station Individual subscriber Directory |
| MSRN | Mobile Subscriber Roaming Number |
| MTC | Message Termination Controller |
| OGW | Originating Gateway |
| PSTN | Public Switched Telephone Network |
| SBS | Service Business System |
| SID | System Identification |
| SP | Send Parameters |
| SRI-SM | Send Routing Information for Short Message |
| STP | Signal transfer Point |
| TLDN | Temporary Location Directory Number |
| VGW | Visited Gateway |
| VLR | Visitor Location Register |
| WSU | Wireless Subscriber Unit |

To more particularly describe the features of the present invention, please refer to FIGS. 1 through 15 in conjunction with the discussion below.

The Telecommunications Network

To understand the method for an automatic location update in accordance with the present invention, first the preferred embodiment of the telecommunications system which may use the present invention needs to be described.

Figure 1:
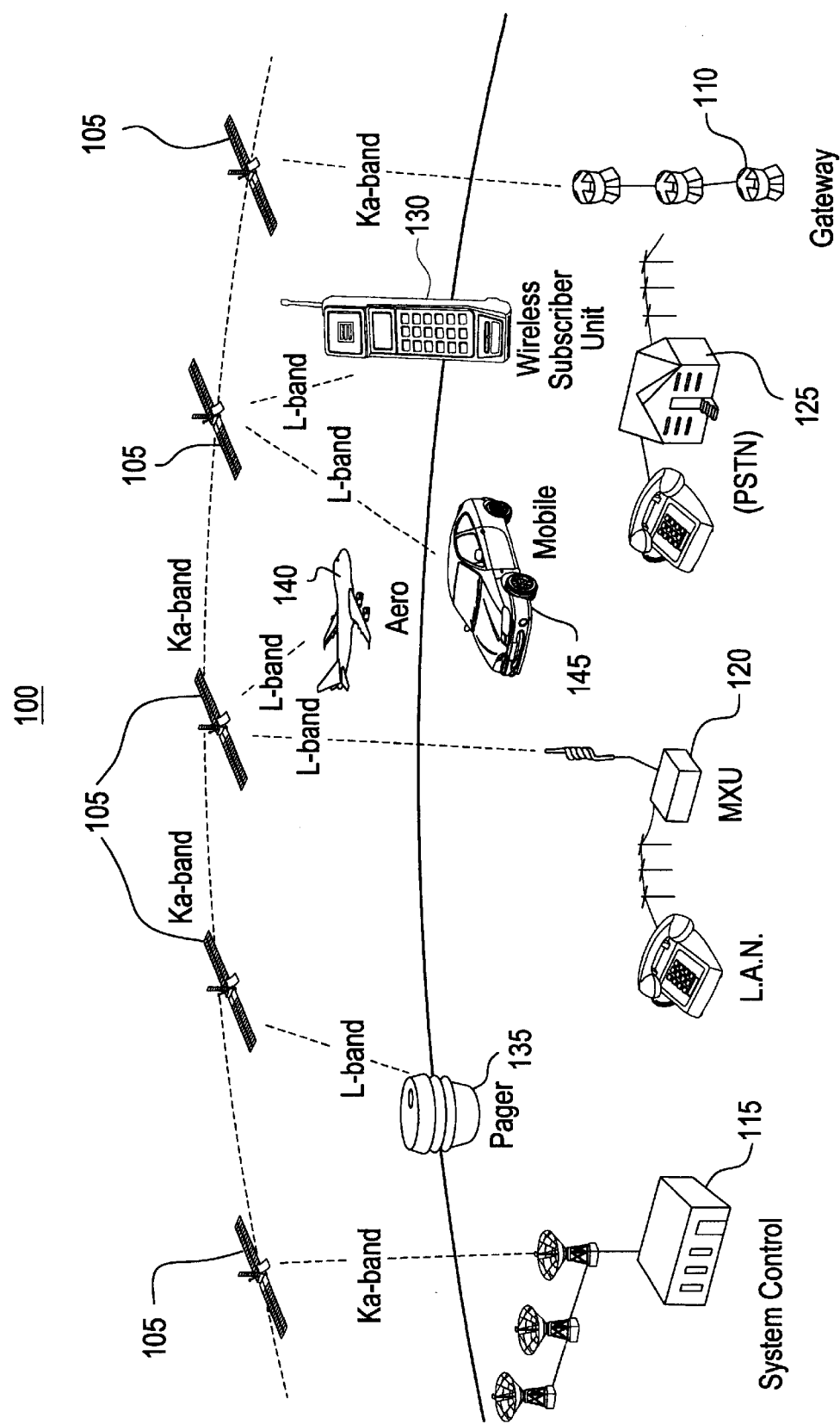
FIG. 1 illustrates a global telecommunications network which may use the present invention.

FIG. 1 illustrates a telecommunications system which may be used with the present invention. The system 100 includes low earth orbiting satellites 105, gateways 110, and system control 115. System Control 115 serves as the central management component for the system 100. Gateways 110 interconnect the satellite constellation 105 with public switched telephone networks 125 (PSTN), making communication possible between system wireless subscriber units (WSU) 130, such as a wireless phone or a fixed wireless device, and any other telephone in the world. Telecommunications services may also be provided to pagers 135, aircrafts 140, and automobiles 145.

Figure 2:
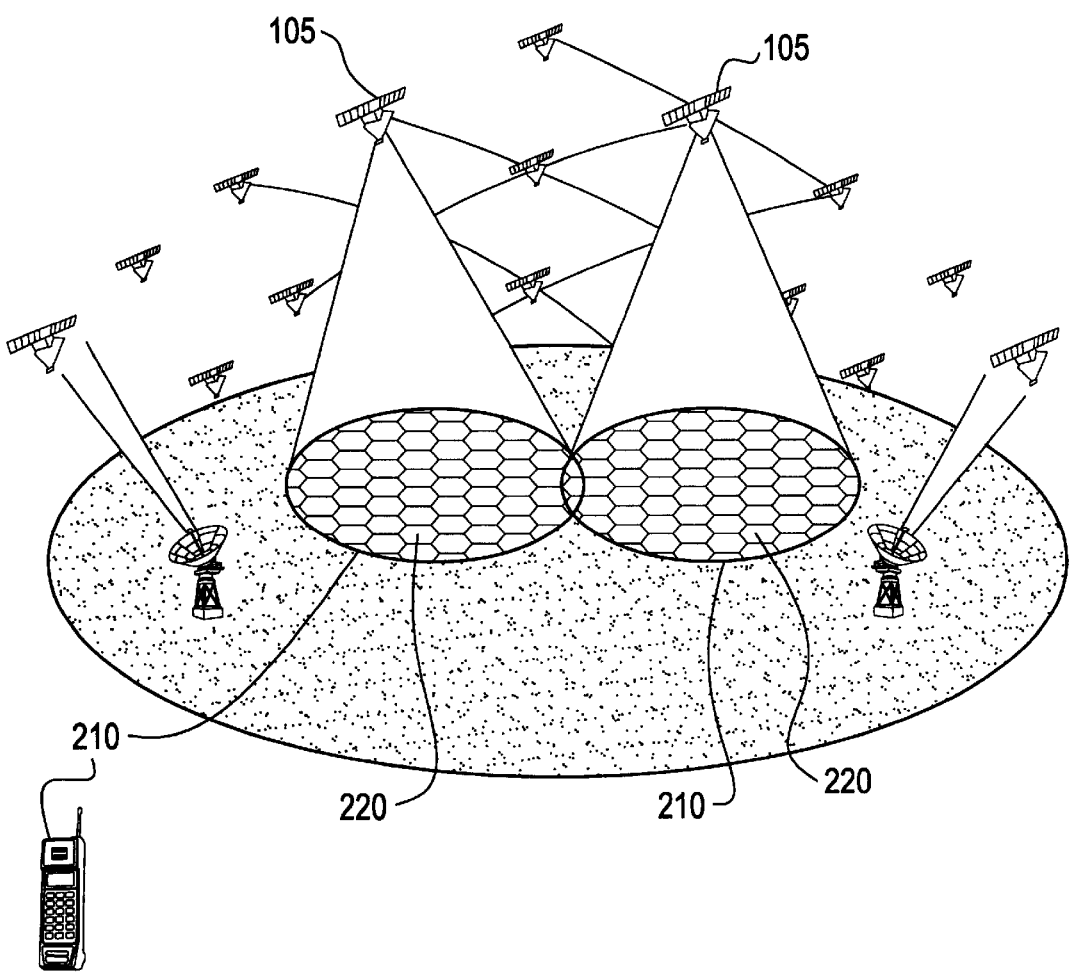
FIG. 2 illustrates satellite footprints of the global telecommunications network of FIG. 1.

The satellites 105 of the system 100 employ intersatellite links 150, or "crosslinks", to communicate directly with each other. These crosslinks 150 provide reliable, high-speed communications between neighboring satellites, allowing call routing and administration to occur efficiently. As illustrated in FIG. 2, each satellite 105 in the constellation has a ground coverage area called a "footprint" 210. The footprint 210 is further divided into smaller areas called "cells" 220. The footprints 210 of the satellites are overlapped to provide maximum coverage.

For a preferred embodiment of the call processing architecture of the system 100, the globe is divided into Location Area Codes (LACs). Each LAC is a service location for the system 100. Each gateway 110 services a certain set of LACs. For example, when a user makes a call from his/her WSU 130 to a particular location, the WSU 130 first links with a satellite 150 which has a cell servicing his/her current LAC. The WSU 130 requests a satellite channel for the call. The request is sent to the gateway 110 which services the caller's LAC. This gateway 110 then initiates the opening of a channel between the WSU 130 and the satellite 110. Once the channel is established, the signal for the phone call is routed through the crosslinks 150 of the satellites 105 to the gateway 110 servicing the LAC of the call's destination. This gateway 110 then sends the call to the PSTN 125 which routes the signal to the particular location called.

Figure 3:
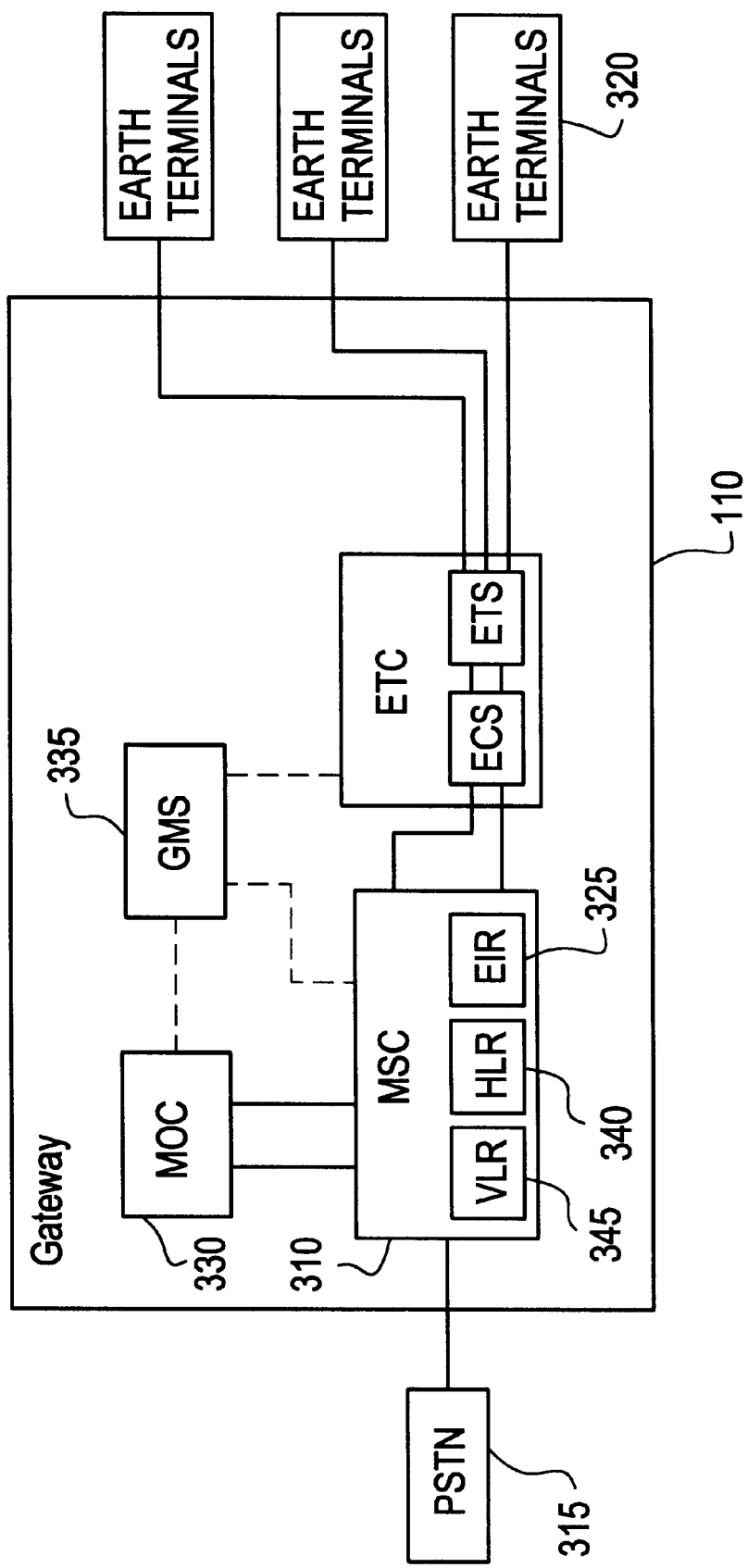
FIG. 3 illustrates a gateway of the global telecommunications network of FIG. 1.

FIG. 3 illustrates in more detail a preferred embodiment of the gateway 110 of the system 100. The heart of the gateway 110 is the Mobile Switching Center 310 (MSC) or the "switch". An example of a switch 310 which may be used is the Siemens GSM-D900 switch. The switch 310 has two "sides": a land side which connects to the local telephone network via the PSTN 315, and a mobile side which connects to Earth Terminal Controllers 320 which communicate with the satellite constellation 105 using K-band radio links. The switch also has a terrestrial connection on the ground which connects the gateways 110, allowing inter-gateway communications. Information for the physical subscriber equipment (WSU 130, pager 135, etc.) is kept in the Equipment Identification Register 325 (EIR). The gateway's 110 Message Origination Controller 330 (MOC) supports a variety of messaging services such as direct messaging to pagers. The Gateway Management System 335 (GMS) provides operations, administration, and maintenance support for each of the gateway subsystems.

In addition to the EIR 325, the switch 330 includes a Home Location Register 340 (HLR) and a Visited Location Register 345 (VLR). The HLR 340 stores subscriber service information for the "Home Gateway". A Home Gateway is assigned to each subscriber to the system 100 and is related to the LAC at which the subscriber is based. The Home Gateway is responsible for granting system access. Whenever a subscriber places or receives a call, the system 100 will determine the subscriber's location with accuracy sufficient for call control. The Home Gateway will receive and evaluate this location information to determine whether it is permissible for the call to proceed. This feature is essential to help ensure compliance with calling restriction laws in nations where such laws exist.

The Home Gateway is also responsible for the assignment of a Visited Gateway as part of the system access process. Subscriber location information is used to index into a map of the world kept at the Home Gateway. This determines a LAC for the visited location which in turn will be used to identify a Visited Gateway which will serve and control the mobile subscriber end of a call.

The Visited Gateway temporarily retains a copy of select subscriber information in its VLR 345. This information remains within the Visited Gateway until the subscriber "roams" into a new Visited Gateway territory or until it expires. When a subscriber is at "Home", the Visited Gateway and the Home Gateway are one and the same.

Figure 4:
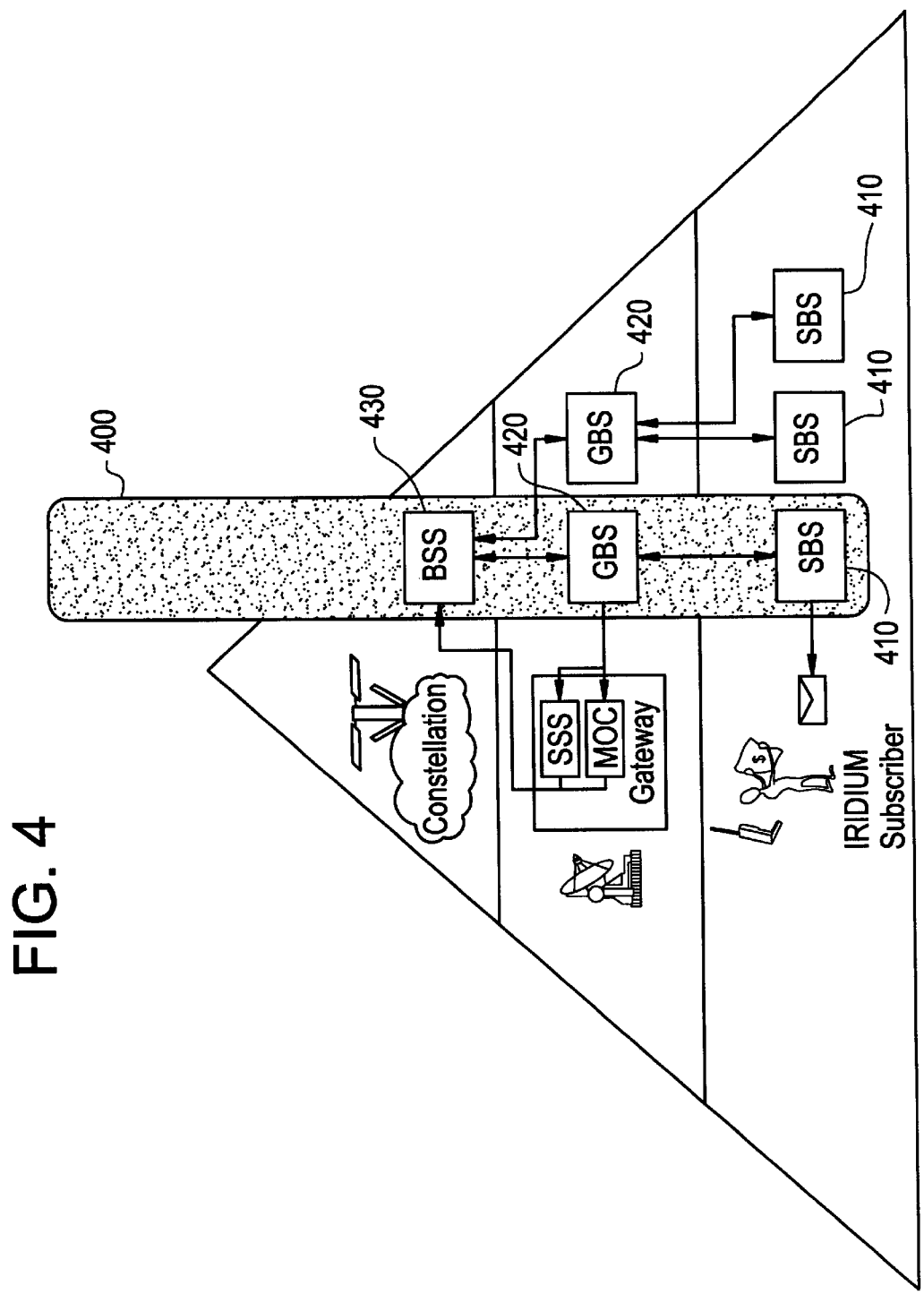
FIG. 4 illustrates a business system for managing the telecommunications network of FIG. 1.

To manage usage information of the system 100, a business system 400 is used. FIG. 4 illustrates a preferred embodiment of a business system 400 which may be used with the present invention. The business system 400 comprises three subsystems: the Service Business System 410 (SBS), the Gateway Business System 420 (GBS), and the Business Support System 430 (BSS).

The SBS 410 includes service providers who sell subscriptions for usage of the telecommunications system 100 directly to the consumer and roaming partners who resells usage of the system 100 and also provide other telecommunications services in their own systems. SBS 410 functions include pre-sales support, service negotiation, general and billing inquiries, payment remittance, pricing and invoicing, receivables management, and account profile maintenance.

The GBS 420 includes gateways 110 (FIG. 1) of the telecommunications system 100 and their operators. The functions of the GBS 420 includes service activation, Tier II customer support, payment and settlement processing, service provider management, usage collection, and retail rating. These functions are performed in the gateways 110.

The functions of the BSS 430 includes gateway relationship management, financial and treasury management, and usage collection. They also include usage verification, revenue distribution, settlement statement generation, and payable/receivable processing. These functions are managed by a Clearinghouse and occurs in the satellites 105.

The Automatic Location Update Process

In the preferred embodiment of the present invention, the method for an automatic location update for network paging is an optional service, called the Messaging/Telephony Location Interworking (MTLI) service, available to network subscribers with both a WSU and a pager. The automatic location updates are accomplished by bundling a subscriber's wireless subscriber unit number with his pager number, or Individual Subscriber Directory Number-A (ISDN-A), and using the WSU's current location to determine the delivery area for a page.

The subscriber's WSU number is either an Iridium network Mobile Station Individual Subscriber Directory Number (MSISDN) or a Global System for Mobile Communications (GSM) MSISDN, depending on where the subscriber is homed. Subscribers who are homed in an IS-41 protocol jurisdiction are assigned an IS-41 Mobile Identification Number (MIN) by their cellular network operation and a non-dialable network MSISDN by Iridium. GSM and IS-41 are two popular communications protocols used around the world for wireless operability and call processing between networks.

Figure 5:
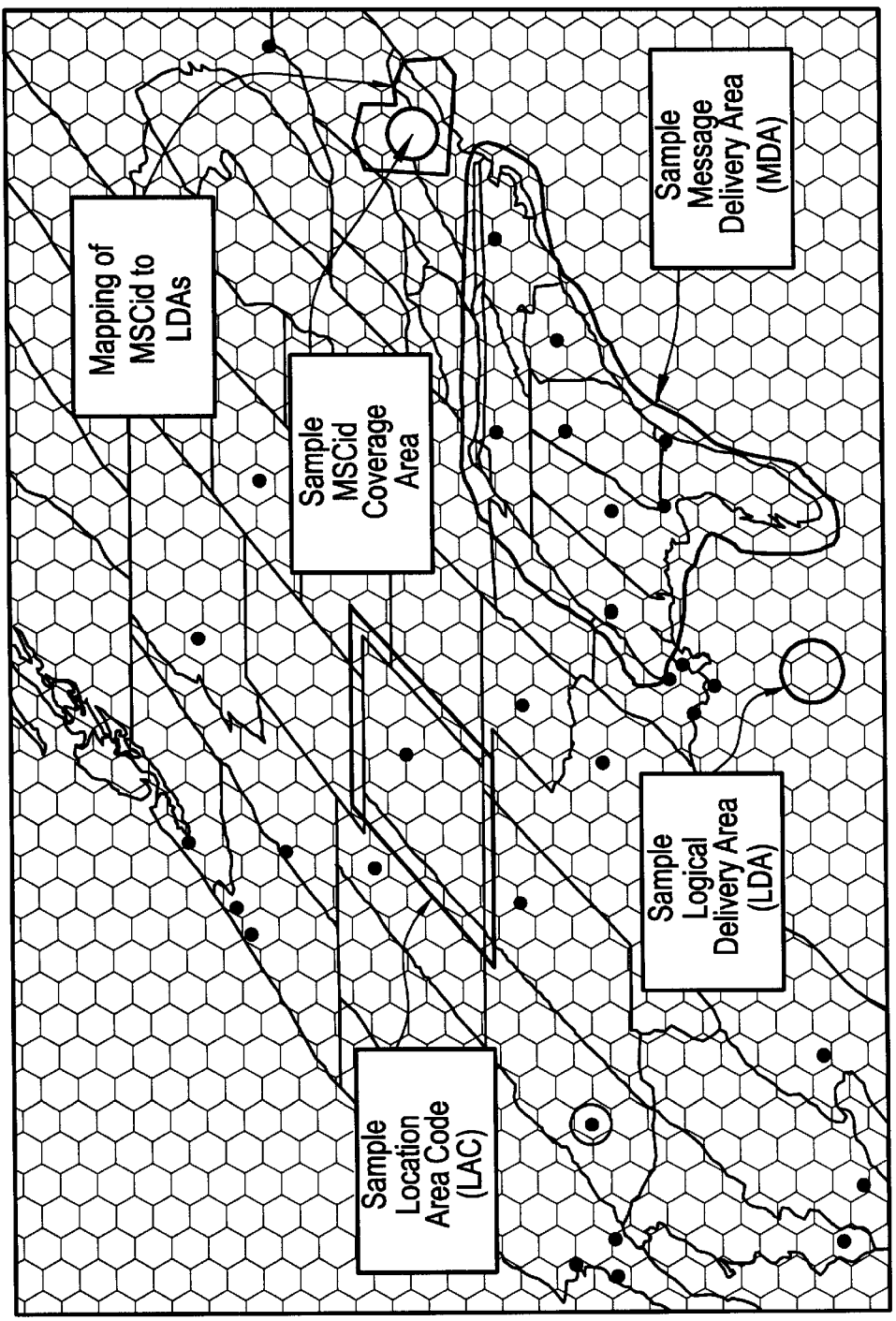
FIG. 5 illustrates the different types of area definitions pertinent to the automatic location update process of the present invention.

FIG. 5 illustrates the different types of area definitions pertinent to automatic location updates. The smallest unit of measure is the Logical Delivery Area (LDA). The LACs are comprised of multiple LDAs. For stand-alone paging, the paging subscriber maintains a table of multiple Message Delivery Areas (MDAs) for their local area. When a Message Delivery Request (MDR) is generated by the MOC of the Home Gateway, a Message Termination Controller (MTC) converts each MDA into a list of the LDAs that comprise that MDA. The MTC is located with the network's master control. It collects all of the pages from every gateway and schedules the satellite constellation 105 resources for delivery to pagers. Pages for that customer are then transmitted to the combined list of LDAs.

When a subscriber roams is homed on the Iridium network, the automatic location update process of the present invention works by identifying the mobile switch upon which the subscriber is currently roaming by identifying the gateway at which the WSU is currently registered. The subscriber registers the WSU by turning it on. When the WSU is turned on, its location is stored in the VLR of the subscriber's Visited Gateway or cellular mobile switch. The current location of the subscriber's WSU is identified through location queries. For subscribers roaming on Iridium network, the particular LAC in which they are located is identified. The LDAs corresponding to this LAC are identified, and the page is then transmitted to the LDAs that make up their current LAC.

For subscribers roaming on a cellular network, the MSCid of their current serving cellular switch is identified. The LDAs containing any portion of that MSCid coverage area are identified. The page is then delivered to all of these LDAs. The MSCid coverage area was developed by SATCOM. For the present invention, a database of MSCids is created and used to determined the appropriate coverage area.

Thus, the MTC contains three databases that are used to determine the list of LDAs for message delivery: MDA to LDA, LAC to LDA, and MSCid to LDA. In this manner, the delivery area of the pager is automatically updated based on the location of the WSU.

The type of network on which the subscriber is currently roaming determines the location information generated by the location queries. In the preferred embodiment, telephony roaming is supported through the Iridium Cellular Roaming Service (ICRS). Iridium telephony subscribers can roam to and from either GSM or IS-41 terrestrial networks. ICRS uses the Iridium Interworking Unit (IIU) to facilitate roaming across different protocols.

Roaming Scenarios

Roaming scenarios under the preferred embodiment of an automatic location update process in accordance with the present invention include: (1) subscriber homed on the Iridium network roaming on the Iridium network; (2) subscriber homed on the Iridium network roaming on a GSM protocol jurisdiction; (3) subscriber homed on the Iridium network roaming on an IS-41 protocol jurisdiction; (4) subscriber homed on a GSM protocol jurisdiction roaming on the Iridium network; (5) subscriber home on an IS-41 protocol jurisdiction roaming on the Iridium network; (6) subscriber homed on a GSM protocol jurisdiction roaming on an IS-41 protocol jurisdiction; and (7) subscriber homed on an IS-41 protocol jurisdiction roaming on a GSM protocol jurisdiction.

For subscribers roaming on the Iridium network, the location information is the current Location Area Identity (LAI) stored in a Visited Gateway's VLR. Contained within the LAI is the LAC. Location queries for subscribers roaming on cellular networks return MSCids. If there is no known location for the subscriber, then the system defaults to the subscriber's selected MDA list. In order for a message to be delivered to the subscriber, the LAC, MSCid, or MDA must be mapped to LDAs.

Message Origination

The preferred embodiment of the automatic location update process in accordance with the present invention begins with message origination. Message origination and message delivery are independent. There are many methods of message origination; it can be in the form of voice mail notification, messages sent to the subscriber's internet ID, numeric messages generated by the calling party using a PSTN, and so forth. Regardless of the method of origination, the message delivery mechanism and location update is determined by the applicable roaming scenario.

Message Delivery

Figure 6:
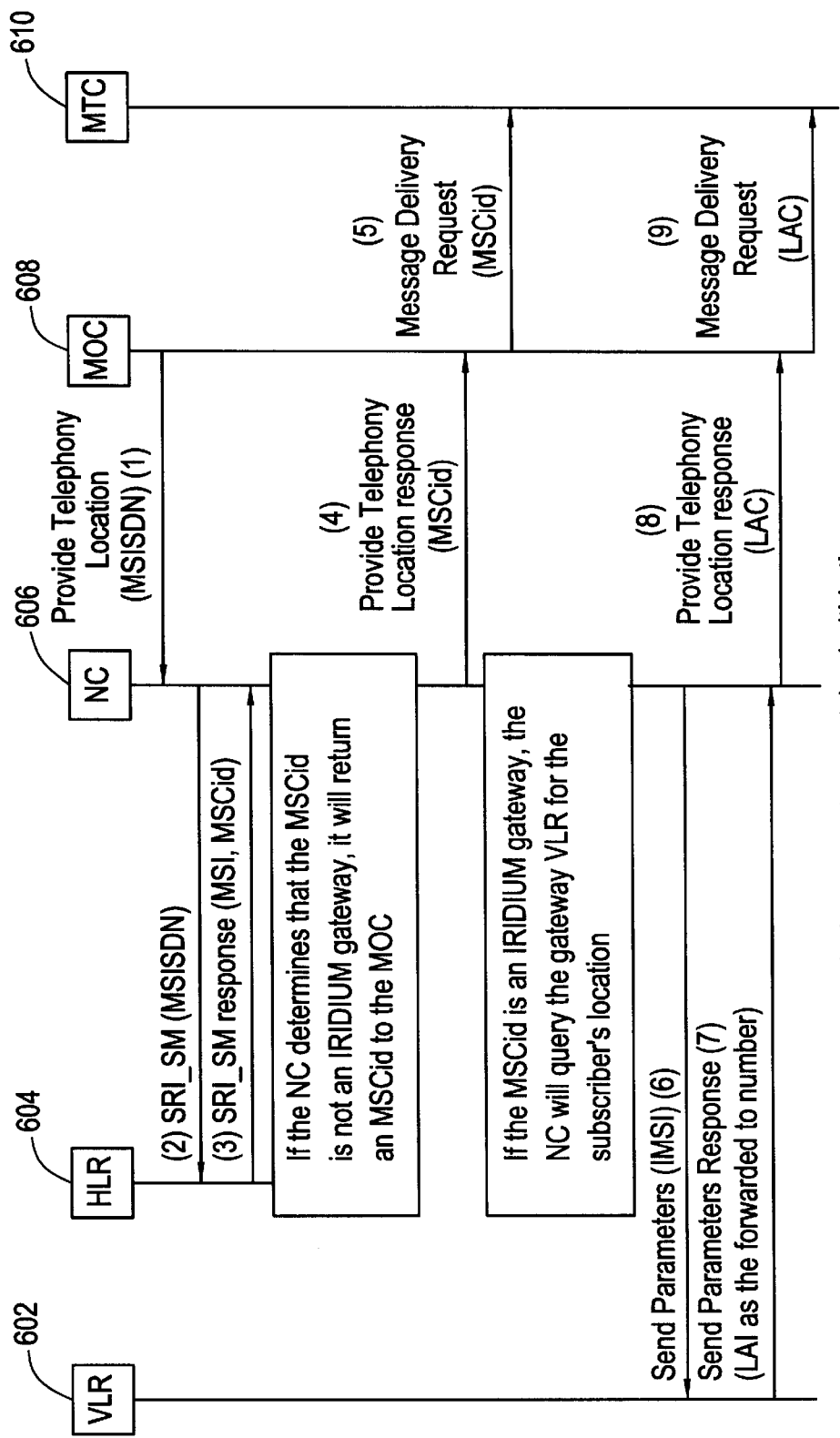
FIG. 6 illustrates a generic signal flow in the delivery of the message in the home MOC in accordance with the present invention.

FIG. 6 illustrates a generic signal flow in the delivery of the messages in the home MOC in accordance with the present invention. The signal flow occurs as follows:

1. The MOC 608 provides the WSU MSISDN to the Notification Center (NC) 606.
2. The NC queries the HLR 604 with a Send Routing Information for Short Message (SRI-SM) query, using the subscriber's MSISDN.
3. The HLR 604 responds with the MSCid of the servicing gateway, along with the International Mobile Subscriber Identity (IMSI) of the WSU. The IMSI is a number used to provide each subscriber in a GSM protocol jurisdiction a unique identification number.

If the NC 606 determines that the MSCid is not an Iridium gateway or IIU:

4. The NC 606 returns an MSCid to the MOC 608.
5. The MOC 608 sends a Message Delivery Request (MDA) with the MSCid to the MTC 610.

If the MSCid is an Iridium gateway:

6. The NC 606 queries the gateway VLR 602 for the WSU's location with a
Send Parameters (SP) query.
7. The VLR 602 sends the LAI as a forwarded to number to the NC 606 as a response.
8. The NC 606 provides the LAC of the WSU's location to the MOC 608.
9. The MOC 608 sends a MDA with the LAC to the MTC 610.

If the MSCid is an Iridium IIU:

10. The NC 606 queries the IIU VLR for the WSU's location with a SP query.
11. The IIU VLR sends the MSCid as a forwarded to number to the NC as a response.

FIGS. 7–12 illustrates the specific signal flow for each of the seven roaming scenarios described above.

Subscriber Homed on the Iridium Network and Roaming on the Iridium Network

Figure 7:
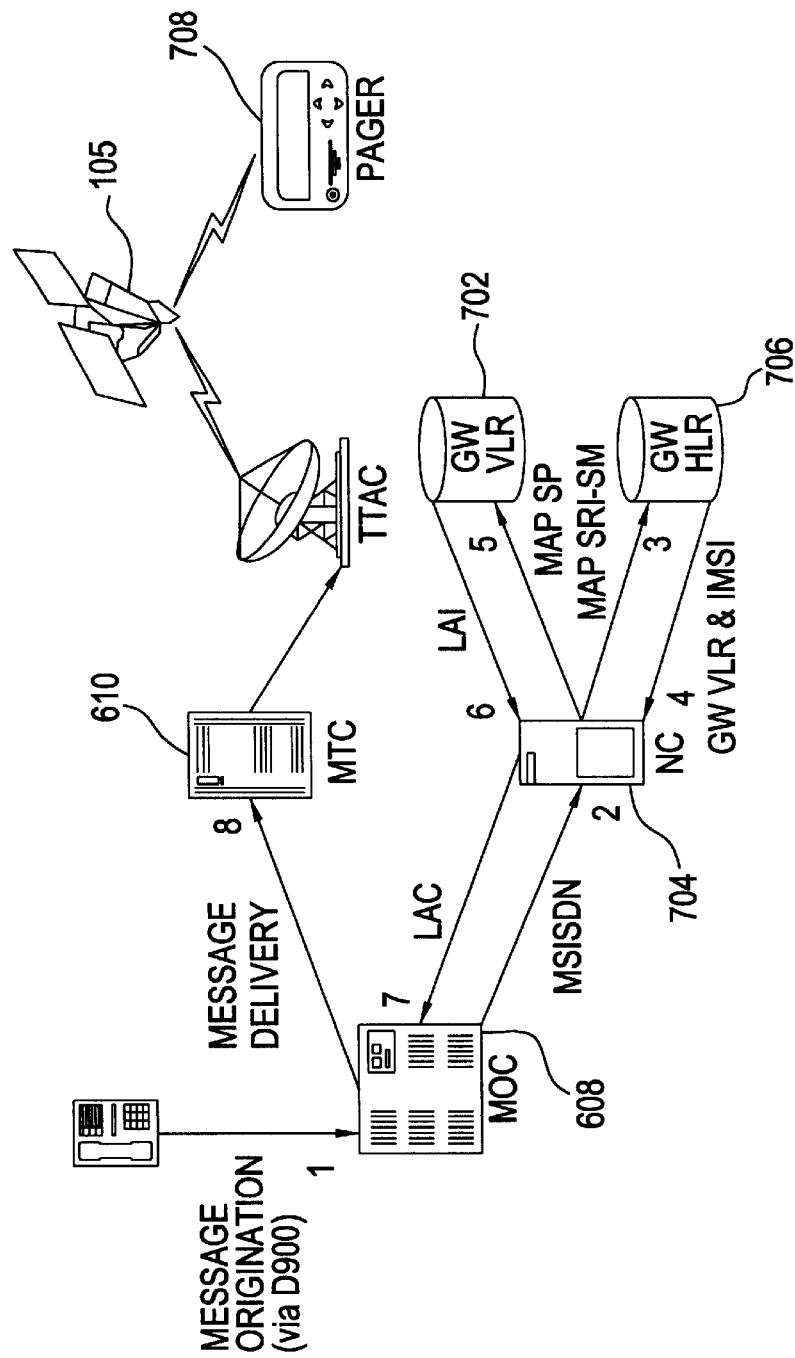
FIG. 7 illustrates the message delivery of a message for a subscriber homed on the Iridium network and roaming on the Iridium network in accordance with the present invention.

FIG. 7 illustrates the message delivery signal flow for a message for a subscriber homed on the Iridium network and roaming on the Iridium network. The location query is directed to the HGW HLR 702. The signal flow occurs as follows:

1. The MOC 608 receives the message via any message origination process.
2. The MOC 608 sends the subscriber's Iridium MSISDN to the NC 704 in the HGW.
3. The NC 704 sends to the HGW HLR 706 a SRI-SM query.
4. The HLR 706 responds with the MSCid of the Visited Gateway and the IMSI of the WSU 708.
5. The VLR 702 of the VGW is then sent a SP query by the NC 704.
6. The VLR 702 responds with the location of the WSU 708 in the form of a LAI. Contained within the LAI is the LAC of the WSU's 702 current location.
7. This LAC is sent to the MOC 608.
8. The MOC 608 sends a MDR to the MTC 610. The MTC 610 translates the LAC to LDAs based on the LAC to LDA database, and sends the page to these LDAs via the satellite constellation 105.

Figure 8:
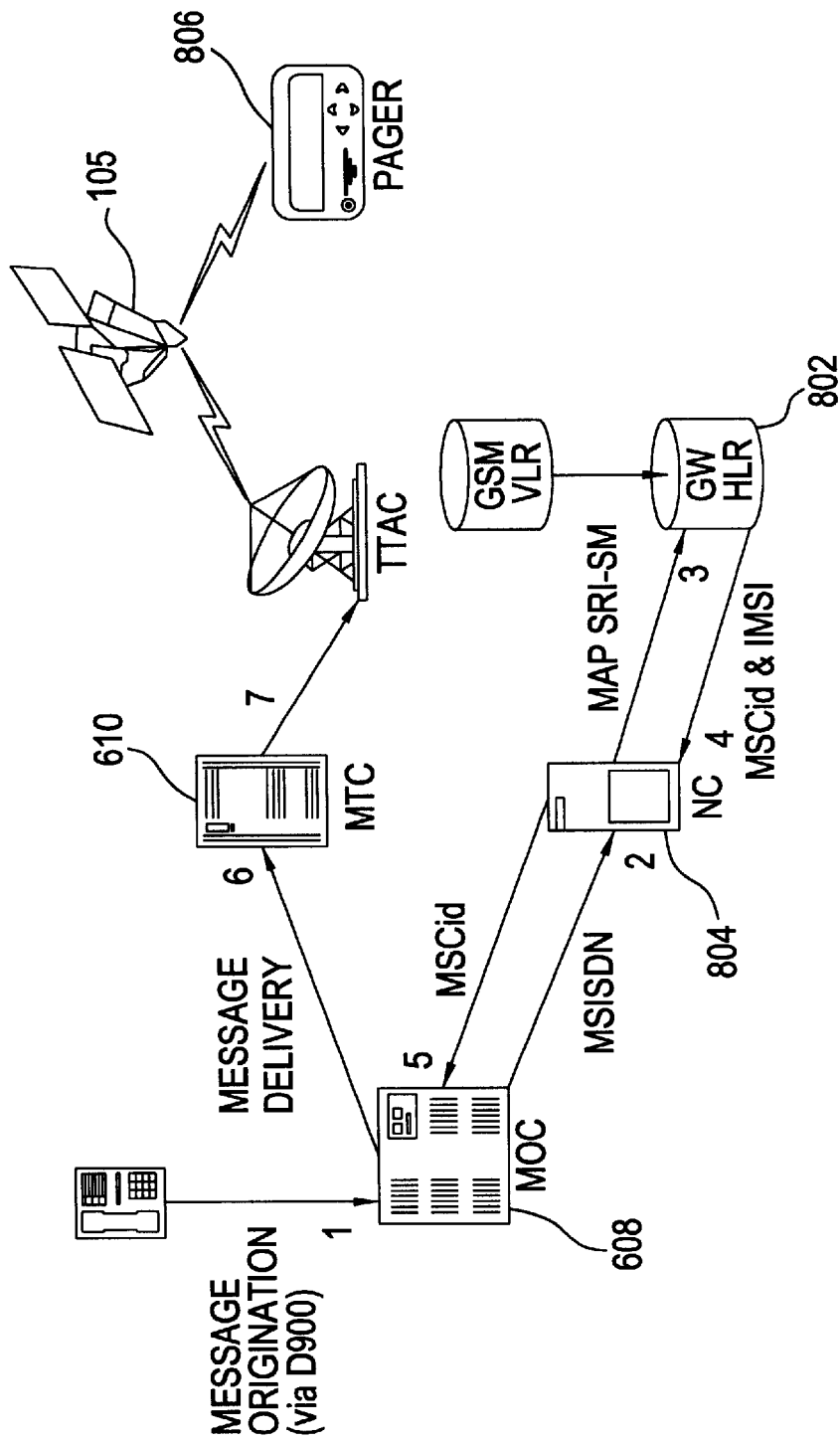
FIG. 8 illustrates the message delivery of a message for a subscriber homed on the Iridium network and roaming on a GSM protocol jurisdiction in accordance with the present invention.

Subscriber Homed on the Iridium Network and Roaming on a GSM Protocol Jurisdiction FIG. 8 illustrates the message delivery signal flow for a message for a subscriber homed on the Iridium network and roaming on a GSM protocol jurisdiction. The location query is again directed to the HGW HLR 802. The signal flow occurs as follows:

1. The MOC 608 receives the message via any message origination process.
2. The MOC 608 sends the subscriber's Iridium MSISDN to the NC 804.
3. The NC 804 sends a SRI-SM query to the HGW HLR 802.
4. The MSCid of the serving cellular switch, as well as the IMSI of the WSU 806, is returned.
5. The MSCid is sent to the MOC 608.
6. The MOC 608 sends a MDR to the MTC 610.
7. The MTC 610 translates the MSCid to LDAs based on the MSCid to LDA database, and sends the page to these LDAs via the constellation 105.

Figure 9:
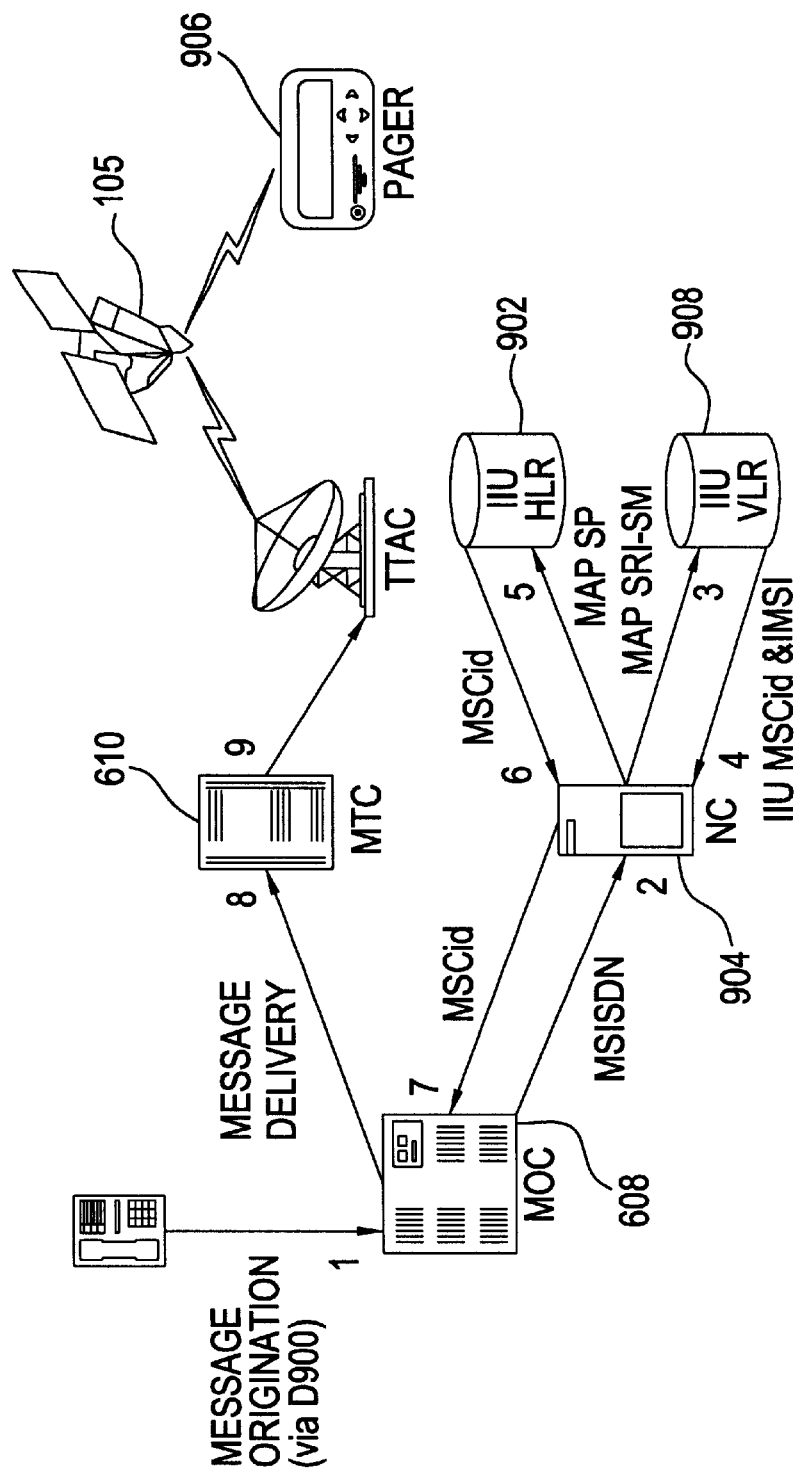
FIG. 9 illustrates the message delivery of a message for a subscriber homed on the Iridium network and roaming on an IS-41 protocol jurisdiction in accordance with the present invention.

Subscriber Homed on the Iridium Network and Roaming on an IS-41 Protocol Jurisdiction FIG. 9 illustrates the message delivery signal flow for a message for a subscriber homed on the Iridium network and roaming on an IS-41 protocol jurisdiction. The location query is directed to the HGW HLR 902. The signal flow occurs as follows:

1. The MOC 608 receives the message via any message origination process.
2. The MOC 608 sends the subscriber's MSISDN to the NC 904.
3. The NC 904 sends a SRI-SM query to the HGW HLR 902.
4. The IIU MSCid, as well as the IMSI of the WSU 906, is returned.
5. The NC 904 sends a SP query to the IIU VLR 908.
6. The MSCid of the servicing IS-41 cellular switch is returned.
7. The MSCid is sent to the MOC 608.
8. The MOC 608 sends a MDR to the MTC 610.
9. The MTC 610 translates the MSCid to LDAs based on the MSCid to LDA database, and sends the page to these LDAs via the constellation 105.

Figure 10:
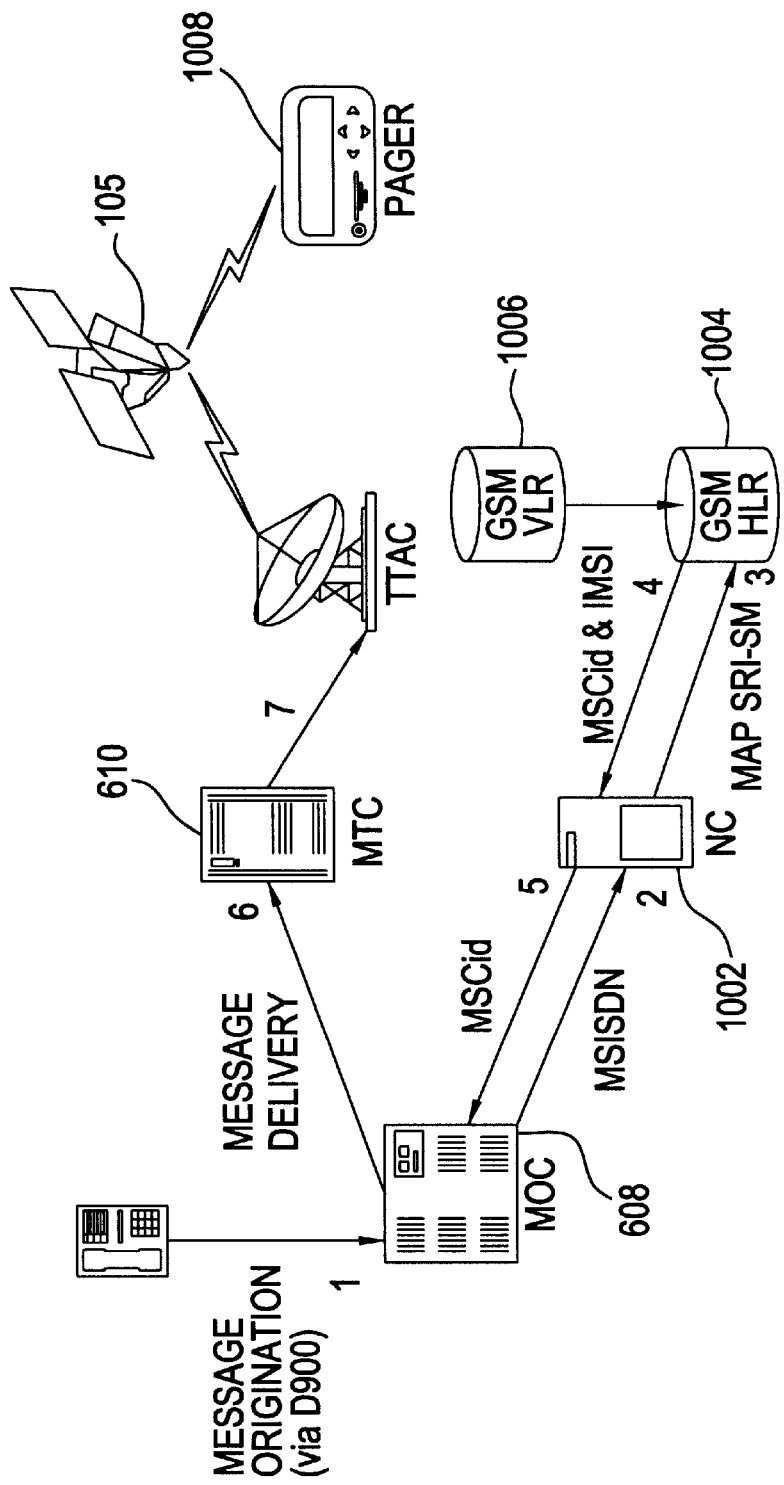
FIG. 10 illustrates the message delivery of a message for a subscriber homed on a GSM protocol jurisdiction and roaming on the Iridium network in accordance with the present invention.

Subscriber Homed on a GSM Protocol Jurisdiction and Roaming on the Iridium Network FIG. 10 illustrates the message delivery signal flow for a message for a subscriber homed on a GSM protocol jurisdiction and roaming on the Iridium network. The location query is directed to the GSM HLR 1004. The signal flow occurs as follows:

1. The MOC 608 receives the message via any message origination process.
2. The MOC 608 sends the subscriber's MSISDN to the NC 1002.
3. The NC 1002 sends a SRI-SM query to the GSM HLR 1004.
4. The GSM HLR 1004 returns the MSCid of an Iridium VGW, along with the WSU's 1006 IMSI.
5. The GSM VLR 1006 of the VGW is then sent to a SP query by the NC 1002.
6. The GSM VLR 1006 responds with the location of the WSU 1006 in the form of a LAI. Contained within the LAI is the LAC of the WSU's 1006 current location.
7. This LAC is sent to the MOC 608.
8. The MOC 608 sends a MDR to the MTC 610. The MTC 610 translates the LAC to LDAs based on the LAC to LDA database, and sends the page to these LDAs via the satellite constellation 105.

Figure 11:
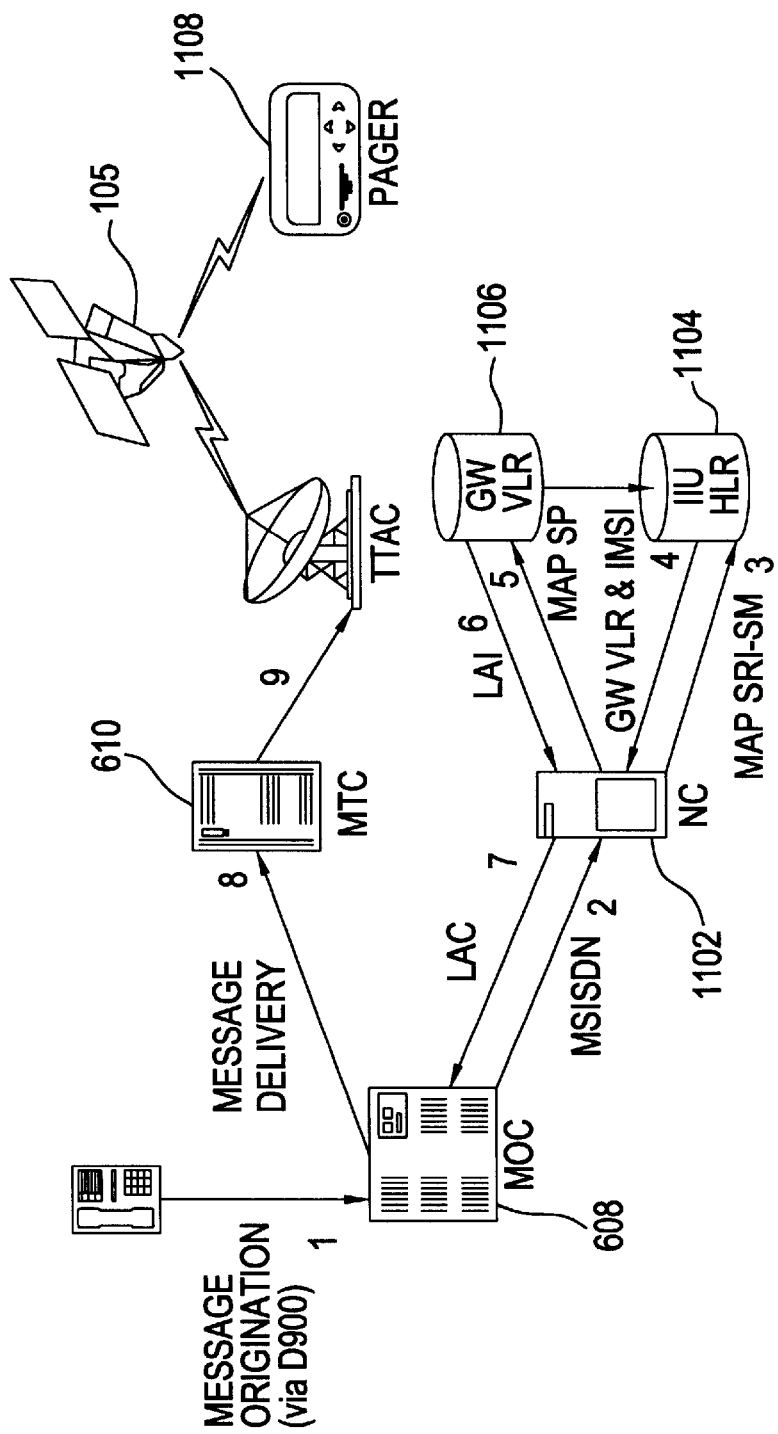
FIG. 11 illustrates the message delivery of a message for a subscriber homed on an IS-41 protocol jurisdiction roaming on the Iridium network in accordance with the present invention.

Subscriber Homed on an IS-41 Protocol Jurisdiction and Roaming on the Iridium Network FIG. 11 illustrates the message delivery signal flow for a message for a subscriber homed on an IS-41 protocol jurisdiction roaming on the Iridium network. The location query by the NC 1102 is directed to the IIU HLR 1104. The signal flow occurs as follows:

1. The MOC 608 receives the message via any message origination process.
2. The MOC 608 sends the subscriber's MSISDN to the NC 1102.
3. The NC 1102 sends a SRI-SM query to the ITU HLR 1104.
4. The MSCid of an Iridium VGW is returned, along with the WSU's 1108 IMSI.
5. The VGW VLR 1106 is queried by the NC 1102 with an SP request.
6. The VGW VLR 1106 returns a LAI. The LAI contains the LAC of the WSU's 1108 current location.
7. This LAC is sent to the MOC 608.
8. The MOC 608 sends a MDR to the MTC 610.
9. The MTC 610 translates the LAC to LDAs based on the LAC to LDA database, and sends the page to these LDAs via the constellation 105.

Figure 12:
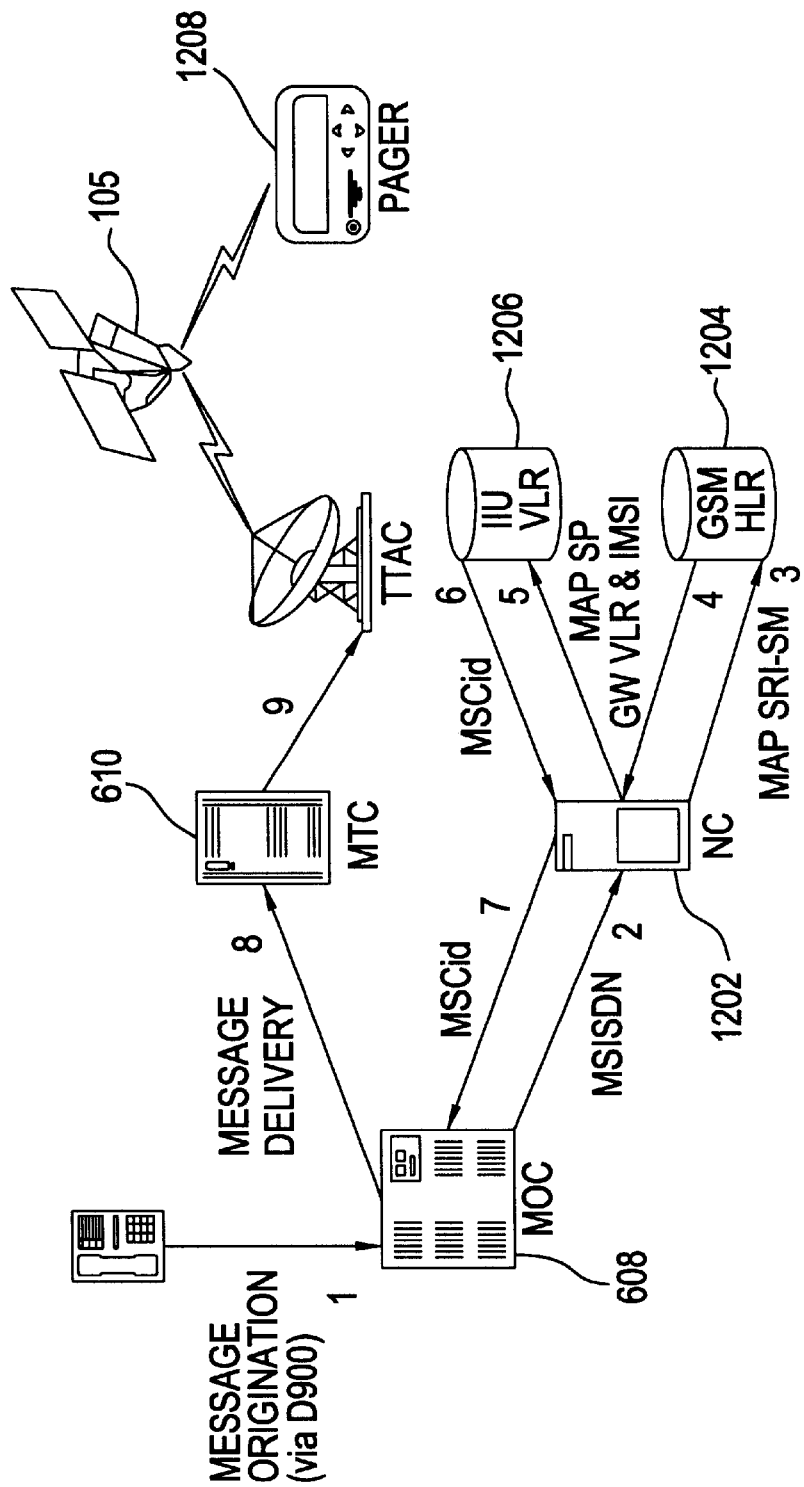
FIG. 12 illustrates the message delivery of a message for a subscriber homed on a GSM protocol jurisdiction roaming on an IS-41 protocol jurisdiction in accordance with the present invention.

Subscriber Homed on a GSM Protocol Jurisdiction and Roaming on an IS-41 Protocol Jurisdiction FIG. 12 illustrates the message delivery signal flow for a message for a subscriber homed on a GSM protocol jurisdiction roaming on an IS-41 protocol jurisdiction. The location query is directed to the GSM HLR 1204. The signal flow occurs as follows:

1. The MOC 608 receives the message via any message origination process.
2. The MOC 608 sends the subscriber's MSISDN to the NC 1202.
3. The NC 1202 sends a SRI-SM query to the GSM HLR 1204.
4. The GSM HLR 1204 returns the IIU MSCid, along with the WSU's 1208 IMSI.
5. The IIU VLR 1206 is queried with an SP request.
6. The ITU VLR 1206 returns the serving MSCid.
7. This MSCid is sent to the MOC 608.
8. The MOC 608 sends a MDR to the MTC 610.
9. The MTC 610 translates the MSCid to LDAs based on the MSCid to LDA database, and sends the page to these LDAs via the constellation 105.

Figure 13:
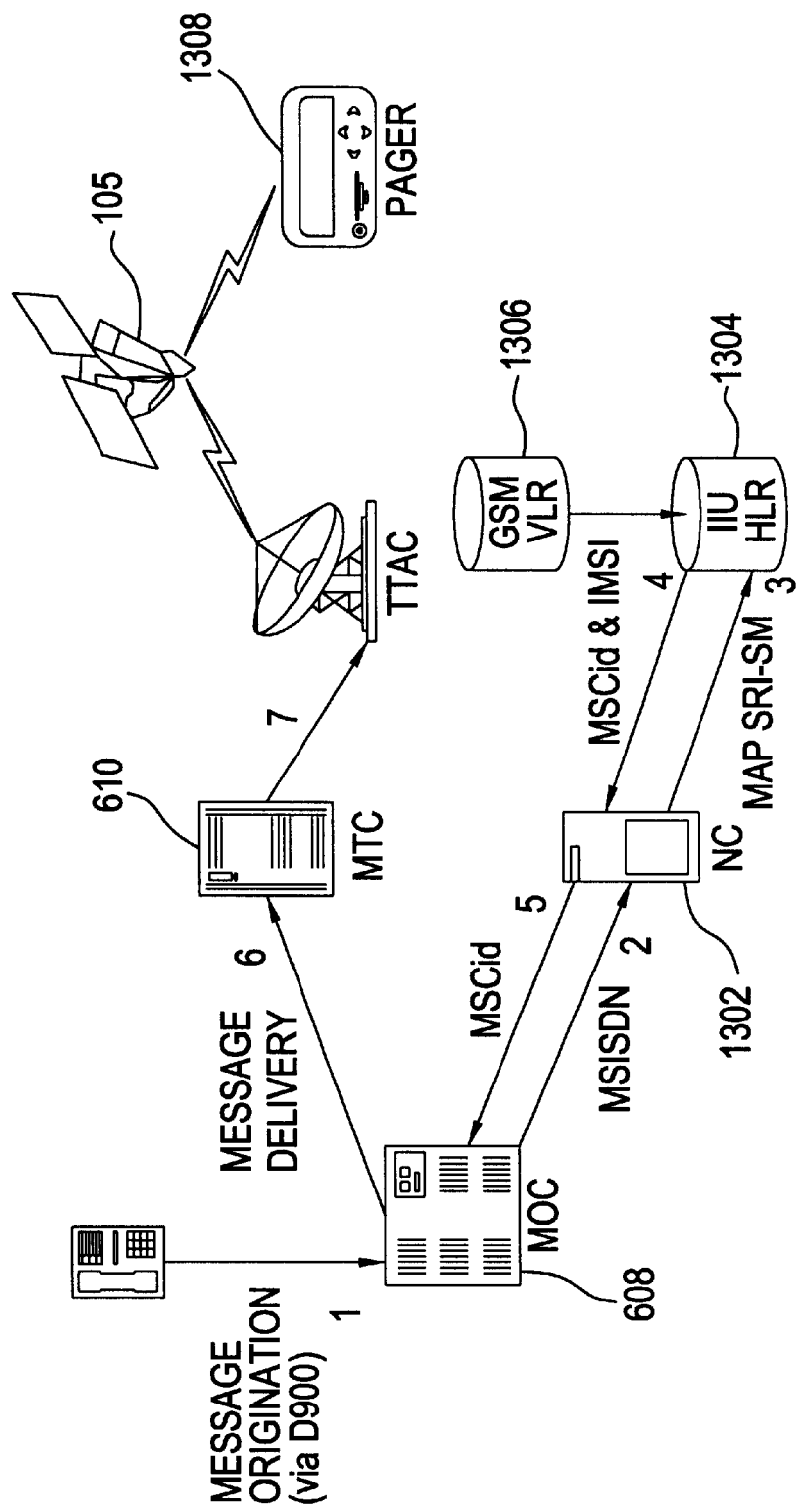
FIG. 13 illustrates the message delivery of a message for a subscriber homed on an IS-41 protocol jurisdiction roaming on a GSM protocol jurisdiction in accordance with the present invention.

Subscriber Homed on an IS-41 Protocol Jurisdiction and Roaming on a GSM Protocol Jurisdiction FIG. 13 illustrates the message delivery signal flow for a message for a subscriber homed on an IS-41 protocol jurisdiction roaming on a GSM protocol jurisdiction. The location query is directed to the IIU HLR 1394. The signal flow occurs as follows:

1. The MOC 608 receives the message via any message origination process.
2. The MOC 608 sends the subscriber's MSISDN to the NC 1302.
3. The NC 1302 sends a SRI-SM query to the IIU HLR 1304.
4. The serving MSCid is returned, along with the WSU's 1308 IMSI.
5. This MSCid is sent to the MOC 608.
6. The MOC 608 sends a MDR to the MTC 610.
7. The MTC 610 translates the MSCid to LDAs based on the MSCid to LDA database, and sends the page to these LDAs via the constellation 105.

Although the preferred embodiment of the automatic location update process has been described in the context of the above seven scenarios, one of ordinary skill in the art will understand that other roaming scenarios could be used without departing from the spirit and scope of the present invention.

By updating the subscriber's location in the above manner, the subscriber may be more accurately located than under conventional location update processes. Thus, a smaller list of LDAs may be targeted for delivery of the message to the pager. With a smaller list of LDAs, less network resource is needed, resulting in a more efficient use of the resources.

Error Management

The errors which may occur in the preferred embodiment of the method in accordance with the present invention includes those occurring: (1) within the MOC, and (2) in the MTC processing of a MDR.

When an error occurs within the MOC, the network responds by using the subscriber's default MDA list to determine the delivery area for the page. This ensures that an attempt is still made to reach the subscriber if for any reason he cannot be located on a cellular switch or the satellite network.

Errors that occur in the MTC processing of a MDR may be the result of a database problem. The MTC receives the MDR from the MOC, but cannot recognize either a LAC or MSCid. This occurs when the location information (LAC, MSCid) is not in a database. A table of all of the MSCids in the world is difficult to obtain as the information is often proprietary. Therefore, missing MSCid's are likely. The method of the present invention addresses this problem by analyzing the GSM MSCids and determining their country. This reduces the reliance on a problematic database. In this situation, the network also responds by using the subscriber's default MDA list to determine the delivery area for the page.

Figure 14:
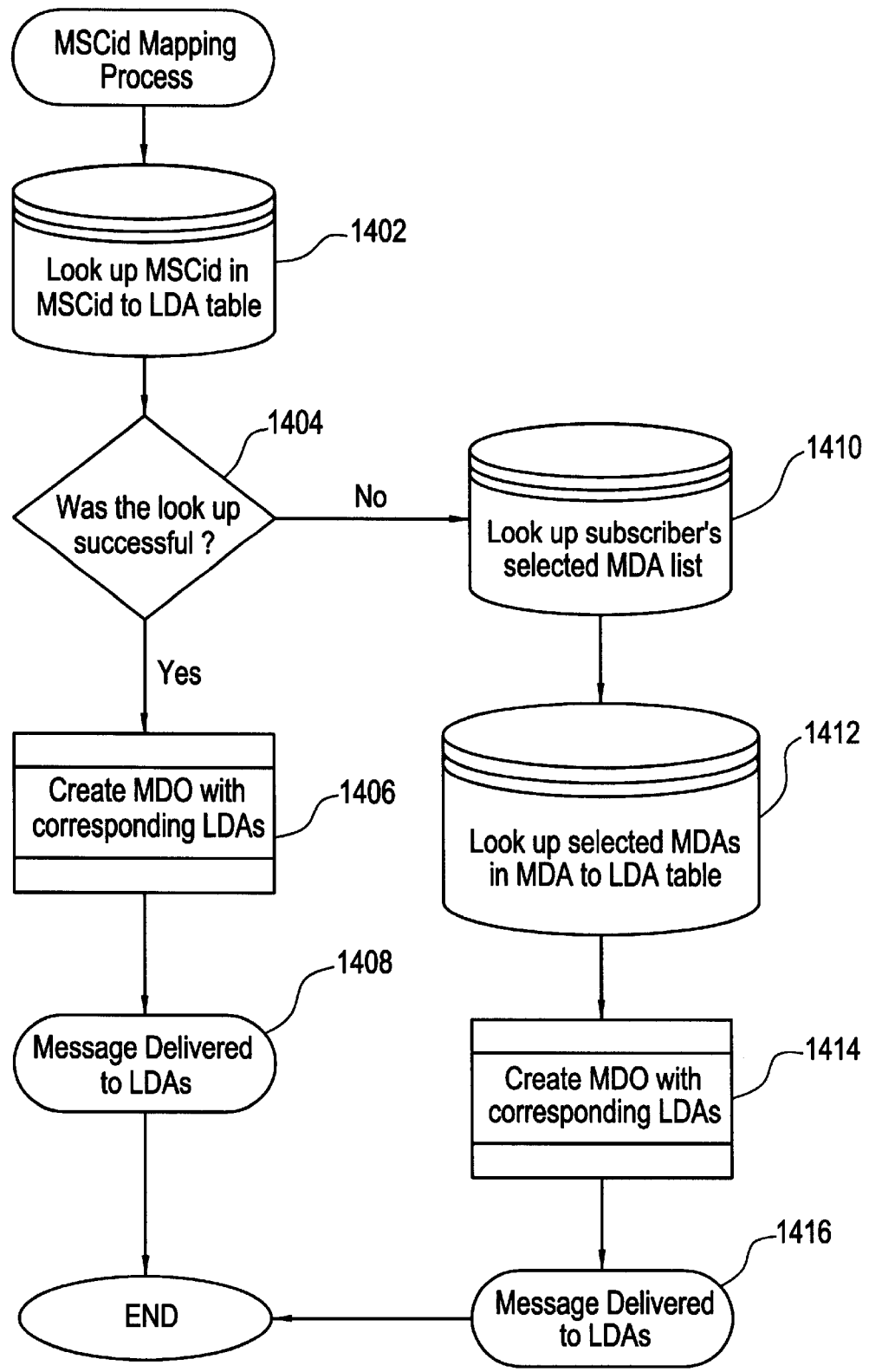
FIG. 14 is a flow chart illustrating the method for error management in accordance with the present invention.

FIG. 14 is a flow chart illustrating a preferred embodiment of a method for error management in accordance with the present invention. First, an attempt to look up the MSCid in the MSCid to LDA table or database is made, via step 1402. If the looked up is determined to be successful, via step 1404, then there is no error. With no error, a MDR with the corresponding LDAs is created, via step 1406, and the message is delivered to the these LDAs, via step 1408. If the attempt is determined not to be successful, via step 1404, then an error occurs. With an error, the subscriber's selected or default MDA list is located, via step 1410. From this list, the selected MDAs in the MDA to LDA database is looked up, via step 1412. A MDR is then created with the corresponding LDAs, via step 1414, and the message is delivered to these LDAs, via step 1416.

Figure 15A:
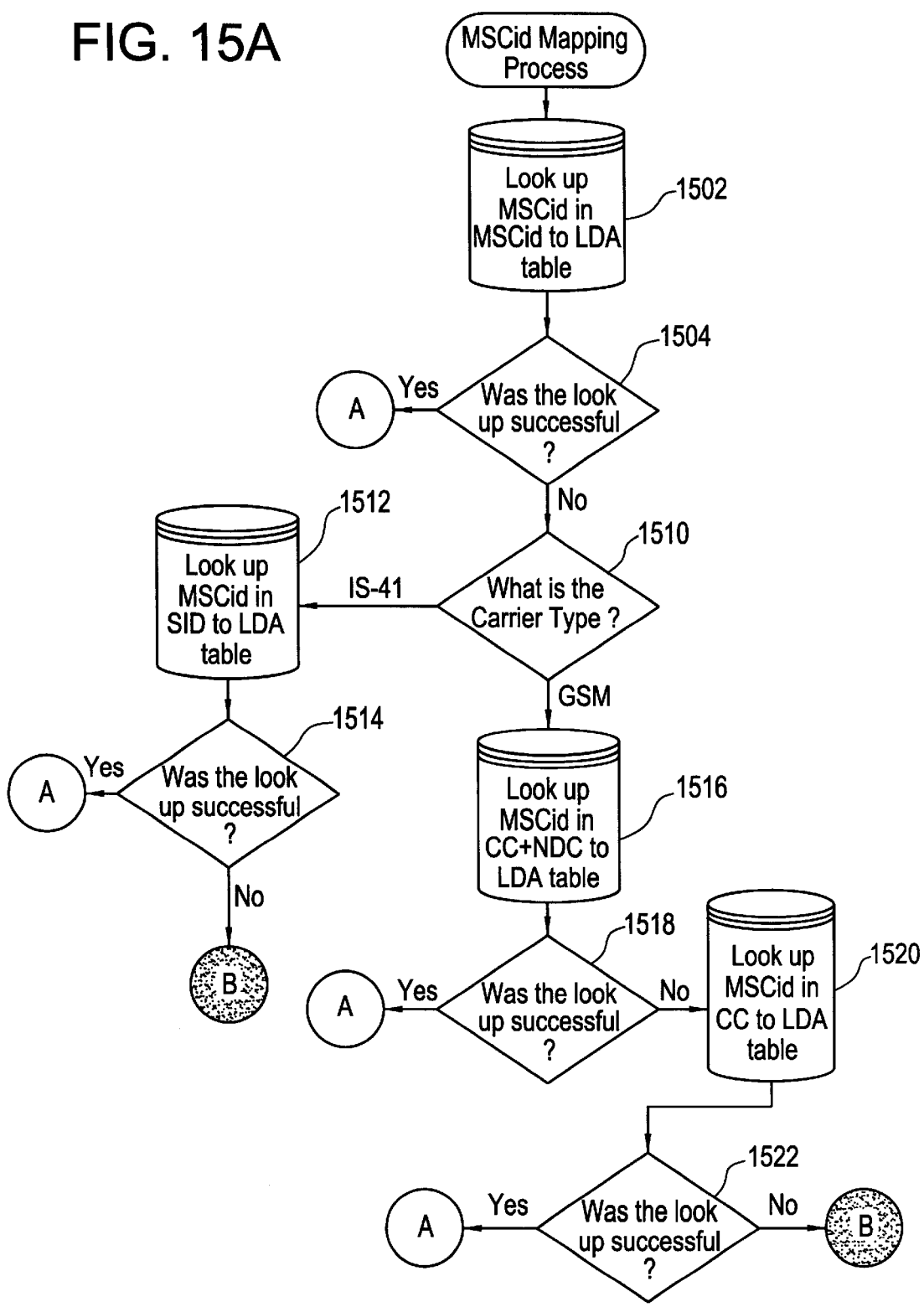
FIG. 15 is a flow chart illustrating in more detail the method for error management in accordance with the present invention.
Figure 15B:
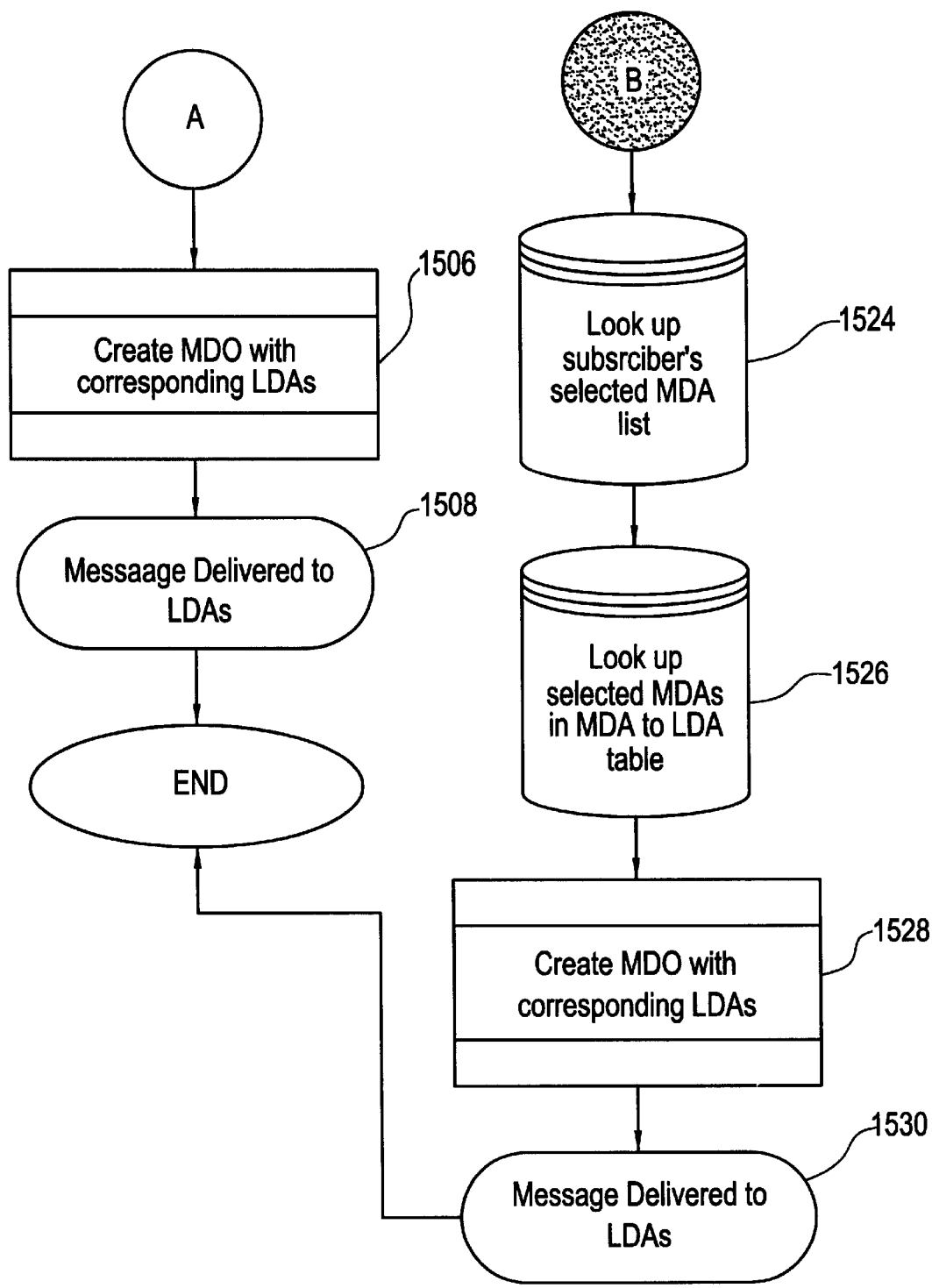

FIG. 15 is a flow chart illustrating in more detail a preferred embodiment of a method for error management in accordance with the present invention. First, an attempt to look up the MSCid in the MSCid to LDA table or database is made, via step 1502. If the look up is determined to be successful, via step 1504, then there is no error. With no error, a MDR with the corresponding LDAs is created, via step 1506, and the message is delivered to these LDAs, via step 1508. If the attempt is determined not to be successful, via step 1504, then the carrier type is determined, via step 1510. If the carrier type is IS-41, then the System Identification (SID) is derived from the MSCid. The SID is looked up in the SID to LDA table, via step 1512. The SID identifies the market area in which the subscriber is currently located. If the look up is determined to be successful, via step 1514, then a MDR is created with the corresponding LDAs, via step 1506, and the message is delivered to these LDAs, via step 1508. If this look up is determined not to be successful, via step 1514, then the subscriber's selected or default MDA list is located, via step 1524. From this list, the selected MDAs in the MDA to LDA table is located, via step 1526. A MDR is then created with the corresponding LDAs, via step 1528, and the message is delivered to these LDAs, via step 1530.

If the carrier type is determined to be GSM, via step 1510, then the method of the present invention takes advantage of the fact that within the MSCid is a country code and network destination code which identifies the country and network in which the subscriber is currently located. When the look up of the MSCid in the MSCid to LDA table fails, the MSCid is then looked up in the country code/network destination code to LDA table, via step 1516. If this look up is determined to be successful, via step 1518, then a MDR with the corresponding LDAs is created, via step 1506, and the message is delivered to these LDAs, via step 1508. If the look up is determined not to be successful, via step 1518, then the MSCid is looked up in a country code to LDA table, via step 1520. If this look up is determined to be successful, via step 1522, then steps 1506 and 1508 are performed. If not, then the subscriber's selected or default MDA list is located, via step 1524. From this list, the selected MDAs in the MDA to LDA table is located, via step 1526. A MDR is then created with the corresponding LDAs, via step 1528, and the message is delivered to these LDAs, via step 1530.

By managing errors in this manner, the reliability of message delivery in the network is significantly improved, and the use of system resources to deliver a page is minimized.

Conclusion

A method for an automatic location update for network paging with error management has been disclosed. The method of the present invention bundles a subscriber's wireless subscriber unit number with his pager number and uses the wireless subscriber unit's current location to determine the delivery area for a page. When an error occurs, the method uses a default delivery area and attempts delivery there. By managing errors in this manner, message delivery is more reliable. This method also saves the subscriber time which he would otherwise spend manually updating his position. It eliminates the problem where the subscriber misses pages when he forgets to update his location or enters the wrong location code. It has the added advantage of reducing the number of location delivery areas in the delivery list which results in more efficient use of network resources.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for updating a location of a subscriber for paging in a global telecommunications network, the subscriber having a wireless subscriber unit and a pager, comprising the steps of:

(a) obtaining an identity of a gateway servicing a first current location for the wireless subscriber unit;

(b) attempting to look up in a database a second current location corresponding to the gateway identity;

(c) if the attempt in step (b) fails, then
  (c1) determining a carrier type for the first current location;
  (c2) if the carrier type is determined to be IS-41, then
    (c2i) attempting to locate one or more LDA corresponding to the gateway identity in a SID to LDA database;
    (c2ii) if the attempt in step (c2i) fails, then looking up the subscriber's default MDA list and looking up the LDA corresponding to the default MDA list;
  (c3) if the carrier type is determined to be GSM, then
    (c3i) attempting to look up the LDA corresponding to the gateway identity in a country code/network destination code (CC/NDC) to LDA database;
    (c3ii) if the attempt in step (c3i) fails, then attempting to look up the LDA corresponding to the gateway identity in a country code (CC) to LDA database;
    (c3iii) if the attempt in step (c3ii) fails, then looking up the subscriber's default MDA list and looking up the LDA corresponding to the default MDA list; and
  (c4) updating the second current location based upon the corresponding LDA;

(d) if the attempt in step (b) is successful, then updating the second current location based upon the gateway identity; and (e) sending a pager message to the second current location.

2. A system for updating a location of a subscriber for paging in a global telecommunications network, the subscriber having a wireless subscriber unit and a pager, comprising:

a message origination controller, wherein the message origination controller obtains a first current location for the wireless subscriber unit; and a message termination controller, wherein the message termination controller comprises means for attempting to look up a second current location for the pager corresponding to an identify of a gateway servicing the first current location, wherein if the attempt fails, then determining a carrier type for the first current location, wherein if the carrier type is determined to be IS-41, then attempting to locate one or more LDA corresponding to the gateway identity in a SID to LDA database, wherein if the attempt in the SID to LDA database fails, then looking up the subscriber's default MDA list and looking up the LDA corresponding to the default MDA list;

wherein if the carrier type is determined to be GSM, then locating the LDA corresponding to the gateway identity in a country code/network destination code (CC/NDC) to LDA database, wherein if the attempt in the CC/NDC to LDA database fails, then attempting to look up the LDA corresponding to the gateway identity in a country code (CC) to LDA database, wherein if the attempt in the CC to LDA database fails, then looking up the subscriber's default MDA list and looking up the LDA corresponding to the default MDA list, wherein the second current location is updated based upon the corresponding LDA, wherein if the attempt is successful, then updating the second current location based upon the gateway identity.

3. A computer readable medium with computer instructions for updating a location of a subscriber for paging in a global telecommunications network, the subscriber having a wireless subscriber unit and a pager, the computer instructions for:
  (a) obtaining a first current location for the wireless subscriber unit, wherein the obtaining instruction (a) further comprises:
    (a1) obtaining an identity of a gateway servicing the first current location, wherein the obtaining instruction (a1) further comprises:
      (a1i) querying a location register for the identity of the gateway;
      (a1ii) receiving the identity of the gateway by a message origination controller; and
      (a1iii) sending a message delivery request by the message origination controller to a message termination controller, wherein the message delivery request comprises the identity of the gateway;
  (b) attempting to update a second current location for the pager based upon the first current location;
  (c) if the attempt fails, then updating the second location based upon a default location; and
  (d) if the attempt is successful, then updating the second current location based upon the first current location.

4. A method for updating a location of a subscriber for paging in a global telecommunications network, the subscriber having a wireless subscriber unit and a pager, comprising the steps of:
  (a) obtaining a first current location for the wireless subscriber unit, wherein the obtaining step (a) further comprises:
    (a1) obtaining an identity of a gateway servicing the first current location, wherein the obtaining step (a1) further comprises:
      (a1i) querying a location register for the identity of the gateway;
      (a1ii) receiving the identity of the gateway by a message origination controller; and
      (a1iii) sending a message delivery request by the message origination controller to a message termination controller, wherein the message delivery request comprises the identity of the gateway;
  (b) attempting to update a second current location for the pager based upon the first current location; and
  (c) updating the second current location based upon a default location if the attempt fails.

5. The method of claim 4, further comprising:
  (d) updating the second current location based upon the first current location if the attempt is successful.

6. The method of claim 4, wherein the querying step (a1i) is performed with a Send Routing Information for Short Message query.

7. The method of claim 4, wherein the identity of the gateway is a Mobile Switching Center Identity.

8. The method of claim 4, wherein the attempting step (b) comprises:
  (b1) receiving a message delivery request by a message termination controller from a message origination controller, wherein the message delivery request comprises an identity of a gateway servicing the first current location; and
  (b2) looking up in a database the second current location corresponding to the identity of the gateway servicing the first current location.

9. The method of claim 4, wherein the updating step (c) comprises:
  (c1) if the attempt fails, then looking up the subscriber's default message delivery area (MDA) list;
  (c2) looking up one or more logical delivery areas (LDA) corresponding to the MDA list; and
  (c3) updating the second current location based on the corresponding LDA.

10. The method of claim 4, further comprising:
  (d) sending a pager message to the second current location.

11. The method of claim 4, wherein the wireless subscriber unit and the pager are provided to the subscriber as a bundled service in the network.

12. A system for updating a location of a subscriber for paging in a global telecommunications network, the subscriber having a wireless subscriber unit and a pager, comprising:
  a message origination controller, wherein the message origination controller obtains a first current location for the wireless subscriber unit, and wherein the message origination controller comprises means for obtaining an identity of a gateway servicing the first current location, wherein the obtaining means comprises:
  means for querying a location register for the identity of the gateway;
  means for receiving the identity of the gateway; and
  means for sending a message delivery request to a message termination controller,
  wherein the message delivery request comprises the identity of the gateway; and a message termination controller, wherein the message termination controller comprises means for attempting to update a second current location for the pager based upon the first current location,
  wherein updating the second current location based upon a default location if the attempt fails.

13. The system of claim 12, wherein the message termination controller further comprises updating the second current location for the pager based upon the first current location if the attempt is successful.

14. The system of claim 12, wherein the identity of the gateway is a Mobile Switching Center Identity.

15. The system of claim 12, wherein the message termination controller comprises:
  means for receiving a message delivery request, wherein the message delivery request comprises an identity of a gateway servicing the first current location; and
  means for looking up in a database the second current location corresponding to the identity of the gateway servicing the first current location.

16. The system of claim 12, further comprising:
  means for sending a pager message to the second current location.

17. A method for updating a location of a subscriber for paging in a global telecommunications network, the subscriber having a wireless subscriber unit and a pager, comprising the steps of:
  (a) obtaining an identity of a gateway servicing a first current location for the wireless subscriber unit;
  (b) attempting to look up in a database a second current location corresponding to an identity of a gateway servicing the first current location;
  (c) looking up the subscriber's default MDA list if the attempt fails;

(d) looking up one or more LDA corresponding to the MDA list; and (e) updating the second current location based on the corresponding LDA.

18. The method of claim 17, further comprising:

(f) updating the second current location based upon the first current location if the attempt is successful.

19. The method of claim 17, wherein the obtaining step (a) further comprises:

(a1) querying a location register for the identity of the gateway;

(a2) receiving the identity of the gateway by a message origination controller; and (a3) sending a message delivery request by the message origination controller to a message termination controller, wherein the message delivery request comprises the identity of the gateway.

20. The method of claim 19, wherein the querying step (a1) is performed with a Send Routing Information for Short Message query.

21. The method of claim 19, wherein the identity of the gateway is a Mobile Switching Center Identity.

22. The method of claim 17, further comprising:

(g) sending a pager message to the second current location.

23. The method of claim 17, wherein the wireless subscriber unit and the pager are provided to the subscriber as a bundled service in the network.

24. A system for updating a location of a subscriber for paging in a global telecommunications network, the subscriber having a wireless subscriber unit and a pager, comprising:

a message origination controller, wherein the message origination controller obtains a first current location for the wireless subscriber unit; and a message termination controller, wherein the message termination controller comprises means for attempting to looking up in a database a second current location for the pager corresponding to an identity of a gateway servicing the first current location, wherein looking up the subscriber's default MDA list if the attempt fails, looking up one or more LDA corresponding to the MDA list, and updating the second current location based on the corresponding LDA.

25. The system of claim 24, wherein the message termination controller further comprises updating the second current location based on the gateway identity if the attempt is success.

26. The system in claim 24, wherein the obtaining means of the message origination controller comprises:

means for querying a location register for the identity of the gateway;

means for receiving the identity of the gateway; and means for sending a message delivery request to the message termination controller, wherein the message delivery request comprises the identity of the gateway.

27. The system of claim 24, wherein the identity of the gateway is a Mobile Switching Center Identity.

28. The system of claim 24, further comprising:

means for sending a pager message to the second current location.

* * * * *